(12) United States Patent
Jansen et al.

(10) Patent No.: US 7,744,151 B2
(45) Date of Patent: Jun. 29, 2010

(54) SUNSHADE ASSEMBLY AND OPEN ROOF CONSTRUCTION PROVIDED THEREWITH

(75) Inventors: Carlo Jansen, Vierlingsbeek (NL); Pieter Antoon Peeters, Horst (NL)

(73) Assignee: Inalfa Roof Systems Group B.V., Venray (NL)

( * ) Notice: Subject to any disclaimer, the term of this patent is extended or adjusted under 35 U.S.C. 154(b) by 147 days.

(21) Appl. No.: 11/867,944

(22) Filed: Oct. 5, 2007

(65) Prior Publication Data

US 2008/0252105 A1    Oct. 16, 2008

(30) Foreign Application Priority Data

Oct. 6, 2006    (EP)    ................... 06121870

(51) Int. Cl.
*B60J 3/02*    (2006.01)
(52) U.S. Cl. ...................... 296/214; 160/272
(58) Field of Classification Search ................. 296/214, 296/100.15; 160/269–272
See application file for complete search history.

(56) References Cited

U.S. PATENT DOCUMENTS 5,579,820 A * 12/1996 LePage et al. ............ 160/268.1
6,179,373 B1 * 1/2001 Bohm et al. ................ 296/214
6,899,380 B2 * 5/2005 Kralik et al. ............... 296/214
7,051,781 B2 * 5/2006 Grimm et al. .............. 160/265
7,063,227 B2 * 6/2006 Looker ..................... 220/345.1
7,114,766 B2 * 10/2006 Becher et al. .............. 296/214
7,516,770 B2 * 4/2009 Jerry ....................... 160/267.1

FOREIGN PATENT DOCUMENTS

DE    19929047 A1    11/1999
DE    10230444 A1    1/2004
FR    2750930 A1    1/1998

OTHER PUBLICATIONS

Official Search Report of the European Patent Office in counterpart foreign application No. EP 06121870 filed Oct. 6, 2006.

* cited by examiner

*Primary Examiner*—Dennis H Pedder
(74) *Attorney, Agent, or Firm*—Steven M. Koehler; Westman, Champlin & Kelly, P.A.

(57) ABSTRACT

A sunshade assembly includes a flexible sunscreen, a rotatable winding shaft for winding and unwinding the sunscreen and two opposed guides for cooperation with two opposed longitudinal edges of the sunscreen. Each guide extends longitudinally in a curved manner in a plane which substantially is perpendicular to the sunscreen and in parallel to the respective longitudinal edge of the sunscreen. Longitudinal edge sections of the sunscreen are less stretchable than the remainder of the sunscreen and are tensioned in the longitudinal direction of the sunscreen.

17 Claims, 2 Drawing Sheets

SUNSHADE ASSEMBLY AND OPEN ROOF CONSTRUCTION PROVIDED THEREWITH

BACKGROUND

The invention firstly relates to a sunshade assembly, comprising a flexible sunscreen, a rotatable winding shaft for winding and unwinding the sunscreen and two opposite guides for cooperation with two opposite longitudinal edges of the sunscreen.

One important field of application of such sunshade assemblies are vehicles which are provided with an open roof construction. Nowadays there is a trend towards larger roof openings, and thus also the need arises for larger sunshade assemblies with larger (longer) sunscreens.

Such larger sunscreens, however, suffer from certain drawbacks. The friction between the guides and the longitudinal edges of the sunscreen increases substantially, which leads to high forces to be exerted by the winding shaft when winding the sunscreen (and, oppositely, by an opposite moving member for unwinding the sunscreen), leading to higher tensions in the sunscreen with a resulting transverse contraction of the sunscreen which, finally, results in an even higher friction or even in a detachment of the longitudinal edges of the sunscreen. As a result of these high forces (such as frictional forces) the sunscreen suffers from an increased wear and even may be damaged or torn. Further there is an increased power demand for moving the sunscreen.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

In accordance with an aspect of the present invention, a sunshade assembly includes a flexible sunscreen, a rotatable winding shaft for winding and unwinding the sunscreen and two opposite guides for cooperation with two opposite longitudinal edges of the sunscreen. Each guide extends longitudinally in a curved manner in a plane which substantially is perpendicular to the sunscreen and in parallel to the respective longitudinal edge of the sunscreen, and wherein longitudinal edge sections of the sunscreen are less stretchable than the remainder of the sunscreen and are tensioned in the longitudinal direction of the sunscreen.

As a result of such a curved extension of the guides, the tensioned longitudinal edge sections of the sunscreen are positioned therein in a secure manner. Because these longitudinal edge sections are less stretchable they will remain in the part of the guide closest to the centre of curvature of the guide. The remainder of the sunscreen, however, is sufficiently stretchable to pass over the parts of the guide further away from the center of curvature of the guide. This construction provides reliable positioning of the edges of the sunscreen in the guides while keeping the forces needed therefore moderate, thus limiting frictional forces.

In an embodiment of the sunshade assembly the guides are curved such that, considered in a longitudinal direction, a central portion thereof is elevated relative to the end portions thereof. Such a curvature, in which the convex side of the guides faces upwards, generally matches the common shape of a roof of a vehicle, thus limiting the amount of space needed to mount the assembly.

It should be noted, however, that an opposite curvature of the guides (convex side facing downwards) results in a sunshade assembly with the same advantageous operation (but may be less appropriate for application in a vehicle).

Each guide at its concave side can be provided with an inclined guide surface. Such an inclined guide surface gives fine guide characteristics balancing between the retention of the edges of the sunscreen and the frictional forces.

The average angle of inclination of said inclined guide surface can be between 15° and 75°. The precise angle depends on matters such as for example, but not exclusively, the material of the sunscreen and the material of the guide surface, and constructional or dimensional features.

Although such an inclined guide surface may be flat, it is also possible that, as seen in a transversal cross-section of the guide, the inclined guide surface has a curved shape.

For example, the inclined guide surface has, considered in a direction towards the sunscreen, an inner section with a first inclination merging into a central section with a second higher inclination merging into an outer section with again a lower inclination. Such a configuration seems to provide excellent guiding performances.

According to another embodiment, the longitudinal edge sections of the sunscreen are made of a different material than the remainder of the sunscreen, such as to provide the required difference in stretching performance.

However, it is conceivable too that the longitudinal edge sections of the sunscreen are made of the same material as the remainder of the sunscreen; however, the edge sections can be impregnated or treated with a substance to make these sections less stretchable.

Typically, said longitudinal edge sections are substantially non-stretchable. This seems to be the optimum for obtaining a low friction and a good retention of the sunscreen edges in the guides In state of the art sunshade assemblies the edge section of the sunscreen often are provided with additional retention means for locking said edge sections in the guides. Generally such retention means are thicker than the remainder of the sunscreen, leading to difficulties when winding the sunscreen onto the winding shaft (e.g. a shift of the sunscreen relative to the winding shaft, an irregullar winding, creases in the sunscreen, the need for additional guiding provisions for leading the edge sections into the guides when unwinding the sunscreen, etcetera).

For avoiding such additional problems, according to yet another embodiment of the sunshade assembly, the longitudinal edge sections of the sunscreen substantially have the same thickness as the remainder of the sunscreen. A regular winding and unwinding onto and from, respectively, the winding shaft will be the result.

For obtaining the required tension in the longitudinal edge sections, several possibilities exist. For example the tensioning of the longitudinal edge sections in the longitudinal direction may be caused, at one end thereof, by a winding force of the winding shaft and, at the opposite end thereof, by tensioning means engaging said edge sections.

In a very simple embodiment, said tensioning means comprise tensioning cables, ropes, belts or alike.

Typically, the tensioning means are moved in synchronism with the winding/unwinding movement of the winding shaft. Thus it is assured that the correct tension is maintained in all positions of the sunscreen.

When at least one of the engaging parts of the sunscreen and guide is provided with a coating for reducing friction therebetween, the operating forces (and, thus, operating power) is minimized further, whereas also a further reduction of wear is obtained.

Secondly, another aspect of the invention relates to an open roof construction assembly for a roof opening in a stationary roof part of a vehicle, comprising a movable closure panel for opening and closing said roof opening, wherein below said roof opening there is provided a sunshade assembly having one or more features herein described.

BRIEF DESCRIPTION OF THE DRAWINGS

Hereinafter the invention will be elucidated while referring to the drawing, in which.

DETAILED DESCRIPTION OF THE ILLUSTRATIVE EMBODIMENT

Figure 1:
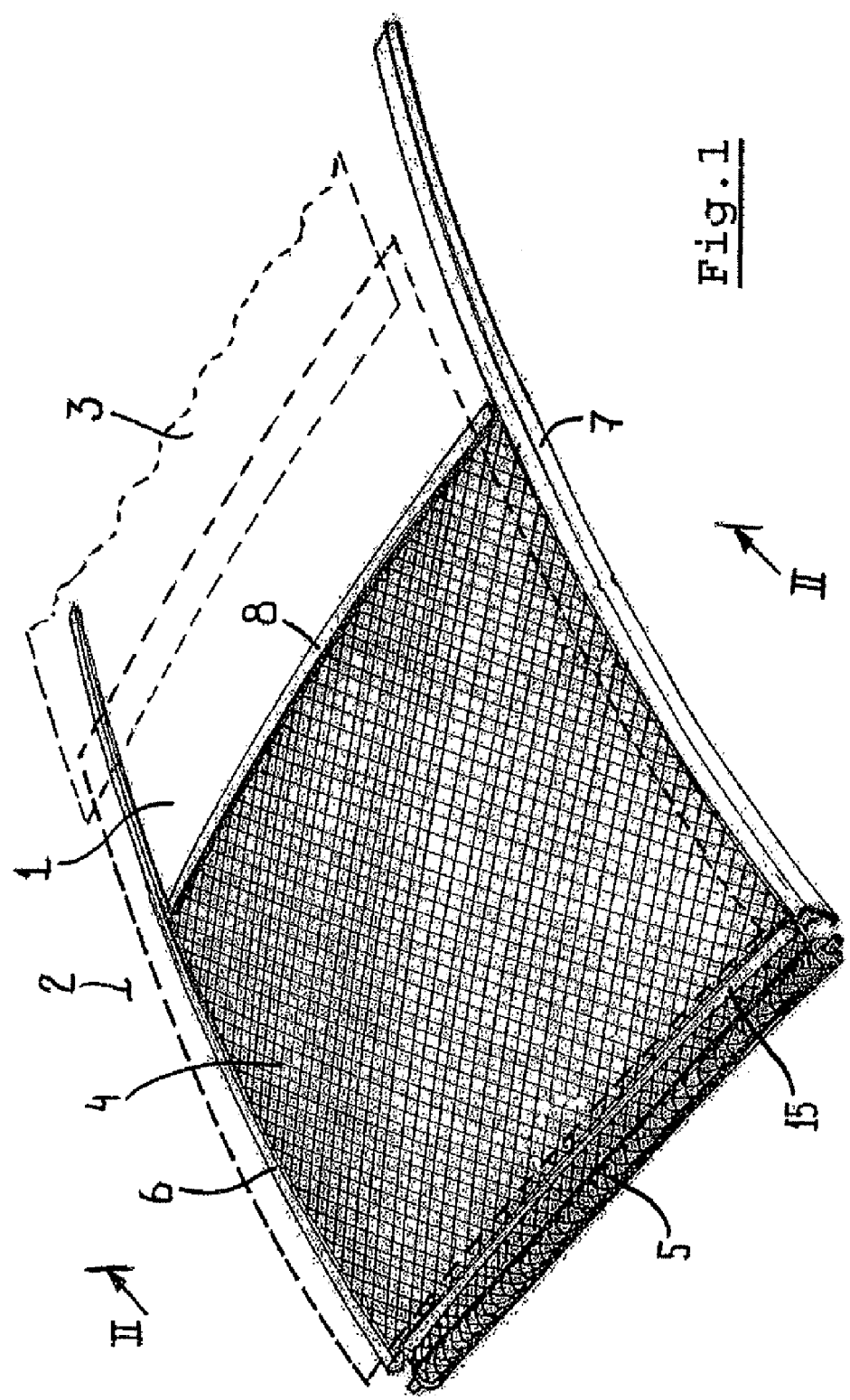
FIG. 1 shows, schematically and in a perspective view, a sunshade assembly applied to an open roof construction.

Firstly referring to FIG. 1, an open roof construction assembly for a vehicle (represented by a stationary roof) is illustrated schematically in dotted lines. Said open roof construction assembly is for opening and closing a roof opening 1 in a stationary roof part 2 of a vehicle and includes a movable closure panel 3 which, by means not illustrated in detail but known per se, can be moved for opening and closing said roof opening 1. Commonly, as is known, the movable panel 3 is guided in longitudinal guides mounted in or formed in the stationary roof part 2 along side the roof opening 1. A user operated device such as a motor or crank is operably coupled to the panel 3 via cables or the like to move the panel 3 selectively. In FIG. 1 the closure panel 3 has been illustrated in a position in which it opens the roof opening 1.

Below the roof opening 1 a sunshade assembly is positioned. Basically, said sunshade assembly comprises a flexible sunscreen 4, a rotatable winding shaft 5 for winding and unwinding the sunscreen 4, and two opposite guides 6 and 7 for cooperation with two opposite longitudinal edges of the sunscreen 4. The guides 6,7 can be connected to or formed integral from a single unitary body with the guides of the closure panel. Likewise, the guides 6,7 can be separate from the guides of the panel, in which case the open roof construction comprises a kit, the minimum of which thus further includes the panel besides the sunshade assembly.

In so far the sunshade assembly has a conventional shape in which, preferably, the winding shaft 5 is preloaded in a sense for winding the sunscreen 4 thereon. Further, in a way known per se, the end of the sunscreen 4 opposite the end which is wound onto the winding shaft 5 can be provided with a pull beam 8 which may be gripped manually for operating the sunscreen 4 and locating it in a desired position.

Figure 2:
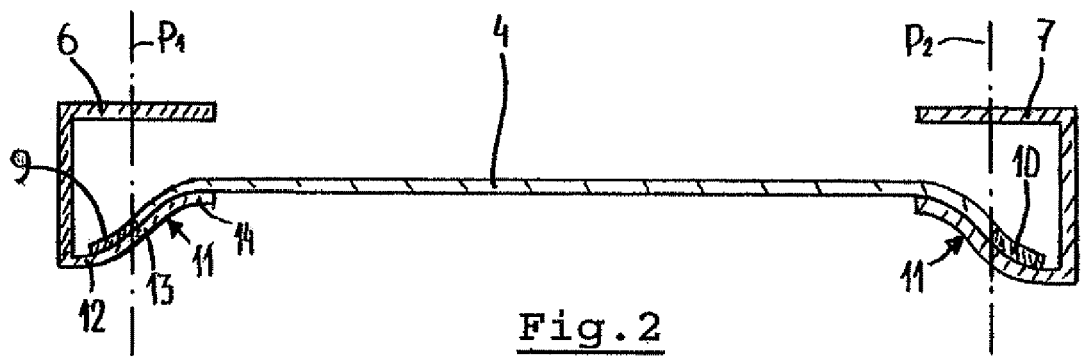
FIG. 2 shows a transverse cross-section according to II-II in FIG. 1.

Each guide 6,7 extends longitudinally in a curved manner in a plane which substantially is perpendicular to the sunscreen 4 and in parallel to the respective longitudinal edge of the sunscreen 4. Said planes will be in parallel to an imaginary vertical plane extending through the longitudinal center line of the sunscreen 4. In FIG. 2, which shows a cross-section according to II-II in FIG. 1, said planes have been illustrated schematically by chained lines P1 and P2.

Again referring to FIG. 2, it is shown clearly that longitudinal edge sections 9 and 10 of the sunscreen 4 are housed in inner parts of the guides 6 and 7. Said longitudinal edge sections 9 and 10 (which extend at the respective edges of the sunscreen 4 along the entire length thereof) are less stretchable then the remainder of the sunscreen 4 which has a certain degree of stretchability and are tensioned in the longitudinal direction of the sunscreen. In one embodiment, the longitudinal edge sections 9,10 of the sunscreen 4 are made of a different material than the remainder of the sunscreen 4, such as to provide the required difference in stretching performance. In addition or in the alternative, longitudinal edge sections 9,10 of the sunscreen 4 are made of the same material as the remainder of the sunscreen, however they are impregnated, treated with a substance or otherwise conditioned to make these sections less stretchable than the remainder of the sunscreen. The manner, in which this tensioning occurs, will be elucidated later.

Figure 3:
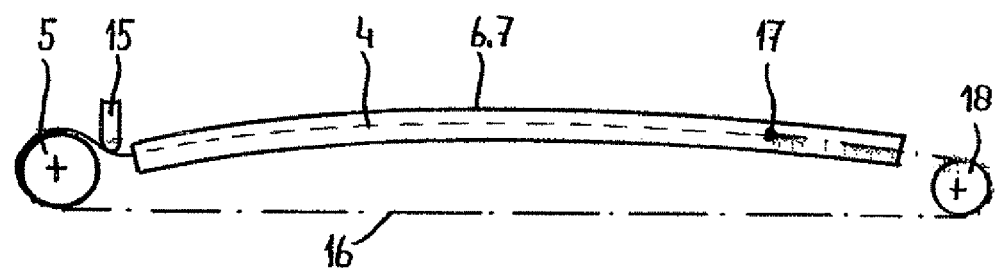
FIG. 3 shows, schematically, a side elevational view of the sunshade assembly.

As illustrated in FIG. 1, but also in FIG. 3 which shows, schematically, a side elevational view of the sunshade assembly illustrated in FIG. 1, it is clearly visible that the guides 6 and 7 are curved such that, considered in a longitudinal direction, where, in this embodiment, a central portion thereof is elevated relative to the end portions thereof.

Again referring to FIG. 2, it is shown that each guide 6, 7 at its concave side is provided with an inclined guide surface 11 (relative to planes P1, P2 or a central portion of the sunscreen 4). Specifically, in the illustrated embodiment, the inclined guide surface 11 of guides 6,7 has, considered in a direction towards a center of the sunscreen 4 and referencing "inner," "central" and "outer" portions of the guides 6, 7, an inner section 12 with a first inclination merging into a central section 13 with a second higher inclination merging into an outer section 14 with again a lower inclination. The inclination may be defined by an angle $\alpha$ as explained later with respect to FIG. 4.

The curved shape of the guides 6, 7 in combination with the fact that the longitudinal edge sections 9 and 10 of the sunscreen 4 are less stretchable then the remainder of the sunscreen 4 results in a good retention of the sunscreen in the guides while keeping frictional forces low when moving the sunscreen 4 relative to the guides 6,7.

Figure 4:
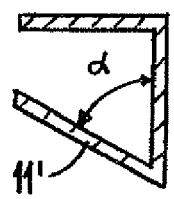
FIG. 4 shows in a transversal cross-section an alternative embodiment of a guide.

FIG. 4 shows a cross-section of an alternative embodiment of a guide. In this embodiment, the inclined guide surface 11' has a straight configuration and includes an angle $\alpha$ with a vertical plane, which angle $\alpha$, in one embodiment, on average preferably lies between 15° and 75°.

Referring to FIG. 3, the sunshade assembly is illustrated schematically in a side elevational view. As stated, one can see clearly that the guides 6, 7 have a curved shape with a central, elevated portion. For assuring that the sunscreen 4 with its edge portions 9 and 10 is not pulled out of the guides 6, 7 near to the winding shaft 5, a guide bar 15 can be provided above the sunscreen 4.

Further FIG. 3 illustrates a tensioning means 16 (for example an elongated, flexible member such as a tensioning cable, tensioning rope, tensioning belt or alike) which with its one end at position 17 is attached to the free end of a respective edge portion of the sunscreen 4 and which with its opposite end is connected to the winding shaft 5 or a mechanism cooperating therewith. The tensioning means 16, which herein extends around a reversal roller 18, is meant to maintain (in combination with the winding shaft 5) the tensioning of the longitudinal edge sections of the sunscreen 4. The connection between the tensioning means 16 and winding shaft 5 is such, that the movement of the tensioning means is synchronized with the movement of the winding shaft 5.

From the figures it further appears clearly that, in the illustrated embodiment, the longitudinal edge sections 9 and 10 substantially have the same thickness as the remainder of the sunscreen 4.

Furthermore, although not illustrated, parts of the guides 6, 7 and/or parts of the sunscreen 4 (especially the parts thereof engaging the guides 6,7) can be provided with a coating for reducing friction between the sunscreen 4 and the guides 6, 7.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. Sunshade assembly comprising:
   a flexible sunscreen having opposed longitudinal edges;
   a rotatable winding shaft configured for winding and unwinding the sunscreen; and
   two opposed guides, wherein each guide is configured to guide one of the longitudinal edges, wherein the guides maintain tension on the sunscreen in a direction transverse to a direction of travel of the sunscreen, wherein each guide extends longitudinally in a curved manner in a plane which substantially is perpendicular to the sunscreen and in parallel to the respective longitudinal edge of the sunscreen and wherein a central portion of each guide is elevated relative to the end portions thereof when considered in a longitudinal direction, and wherein the sunscreen when extended comprises an arcuate configuration wherein a middle portion is raised relative to the opposed longitudinal edges and wherein longitudinal edge sections of the sunscreen are less stretchable than the remainder of the sunscreen and wherein the longitudinal edge sections slidably engage a transversely angled and inclined guide surface on each of the guides to form the arcuate configuration of the sunscreen when extended.

2. The sunshade assembly according to claim 1, wherein an average angle of inclination of said inclined guide surface relative to each corresponding plane is in the range of 15° and 75°.

3. The sunshade assembly according to claim 1, wherein, as seen in a transversal cross-section of the guide, the inclined guide surface has a curved shape.

4. The sunshade assembly according to claim 3, wherein the inclined guide surface has, considered in a direction towards a center of the sunscreen, an inner section with a first inclination merging into a central section with a second higher inclination merging into an outer section with again a lower inclination.

5. The sunshade assembly according to claim 1, wherein the longitudinal edge sections of the sunscreen are made of a different material than the remainder of the sunscreen.

6. The sunshade assembly according to claim 1, wherein the longitudinal edge sections of the sunscreen are made of the same material as the remainder of the sunscreen, however are less stretchable.

7. The sunshade assembly according to claim 1, wherein said longitudinal edge sections are substantially non-stretchable.

8. The sunshade assembly according to claim 1, wherein the longitudinal edge sections of the sunscreen substantially have the same thickness as the remainder of the sunscreen.

9. The sunshade assembly according to claim 1 and further comprising a tensioning device coupled to the sunscreen, wherein the tensioning device is configured to cause tension of the longitudinal edge sections in the longitudinal direction by a winding force of the winding shaft.

10. The sunshade assembly according to claim 9, wherein said tensioning device comprises an elongated flexible member.

11. The sunshade assembly according to claim 10, wherein the tensioning device is moved in synchronism with the winding/unwinding movement of the winding shaft.

12. The sunshade assembly according to claim 1, wherein at least one of the engaging parts of the sunscreen and guide is provided with a coating for reducing friction therebetween.

13. An open roof construction assembly kit for a vehicle having an opening in a stationary roof, the kit comprising:
   a movable closure panel configured for opening and closing said roof opening; and
   a sunshade assembly comprising:
      a flexible sunscreen having opposed longitudinal edges wherein side sections of the sunscreen proximate the longitudinal edges are substantially non-stretchable and remainder of the sunscreen is stretchable;
      a rotatable winding shaft configured for winding and unwinding the sunscreen;
      two opposed guides, wherein each guide is configured to guide one of the longitudinal edges, wherein the guides maintain tension on the sunscreen in a direction transverse to a direction of travel of the sunscreen wherein each of the two opposed guides comprise a transversely inclined angled surface such that the longitudinal edges of the sunscreen slidably engage the inclined angled surfaces wherein the engagement of the longitudinal edges with the inclined angled surfaces provides tension on the flexible sunscreen traverse to the direction of travel when being extended, wherein each guide extends longitudinally in a curved manner in a plane which substantially is perpendicular to the sunscreen and in parallel to the respective longitudinal edge of the sunscreen, and wherein the sunscreen when extended comprises an arcuate configuration wherein a middle portion is raised relative to the opposed longitudinal edges; and
      a tensioning device coupled to the sunscreen, wherein the tensioning device is configured to cause tension of the longitudinal edge sections in the longitudinal direction by a winding force of the winding shaft.

14. An open roof construction assembly kit for a vehicle having an opening in a stationary roof, the kit comprising:
   a movable closure panel configured for opening and closing said roof opening; and
   a sunshade assembly comprising:
      a flexible sunscreen having opposed longitudinal edges;
      a rotatable winding shaft configured for winding and unwinding the sunscreen;
      two opposed guides, each guide having a longitudinal guide surface that comprises a back portion aligned with a plane that is substantially perpendicular to the sunscreen and in parallel to the respective opposed longitudinal edge of the sunscreen and having a top edge and a bottom edge, a top portion extending from the top edge of the back portion at a substantially right angle and an inclined angled surface extending from the bottom edge wherein the top portion, the back portion and the inclined angled surface form a channel: and wherein the angled surface of each guide provides support to one of the longitudinal edges, wherein the guides maintain tension on the sunscreen in a direction transverse to a direction of travel of the sunscreen, wherein each guide extends longitudinally in a curved manner in the plane, and wherein the sunscreen when extended comprises an arcuate configuration wherein the longitudinal edges are drawn into the guide through sliding engagement with the inclined angled surfaces such that a middle portion is raised relative to the opposed longitudinal edges.

15. The roof construction of claim 14 and wherein the inclined guide surface of the guide relative to each corresponding plane is in the range of 15° and 75°.

16. The roof construction of claim 14 and wherein the inclined guide surface comprises a convex surface that engages the longitudinal edges of the sunscreen.

17. The roof construction of claim 14 and further comprising a guide bar positioned between the rotatable winding shaft and the two opposed guides wherein the guide bar engages the sunscreen and prevents the longitudinal edges of sunscreen from disengaging the opposing guides.

* * * * *